803979 11/1958 United Kingdom ............ 192/53 F

Primary Examiner—Leslie A. Braun
Assistant Examiner—David A. Testardi
Attorney, Agent, or Firm—Kokjer, Kircher, Bradley, Wharton, Bowman & Johnson

United States Patent [19]
Knödel et al.

[11] Patent Number: 4,817,773
[45] Date of Patent: Apr. 4, 1989

[54] SYNCHRONIZING MECHANISM FOR CLUTCHES

[75] Inventors: Gunter Knödel, Mühlacker; Wolfgang Lees, Ludwigsburg, both of Fed. Rep. of Germany

[73] Assignee: Getrag Getriebe-und Zahnradfabrik GmbH, Fed. Rep. of Germany

[21] Appl. No.: 54,946

[22] Filed: May 27, 1987

Related U.S. Application Data

[63] Continuation of Ser. No. 803,305, Dec. 2, 1985, abandoned.

[30] Foreign Application Priority Data

Dec. 7, 1984 [DE] Fed. Rep. of Germany ....... 3444670

[51] Int. Cl.⁴ ............................................. F16D 23/08
[52] U.S. Cl. .................................... 192/53 F; 74/339
[58] Field of Search ................. 192/53 F, 53 R, 53 G, 192/53 A; 74/339

[56] References Cited

U.S. PATENT DOCUMENTS 1,997,056  4/1935  Griswold .......................... 192/53 F
3,860,101  1/1975  Defeo et al. ...................... 192/53 F

FOREIGN PATENT DOCUMENTS 1103149  3/1961  Fed. Rep. of Germany .
1965844  7/1971  Fed. Rep. of Germany .
1450722  7/1972  Fed. Rep. of Germany .
1152699  9/1957  France .
_75379   5/1961  France .
 624170  5/1949  United Kingdom ............. 192/53 R

[57] ABSTRACT

In synchronizing mechanisms for clutches having arranged between the clutch body (10) and the axially displaceable gear shift sleeve, each of which are provided with a toothing, a synchronizing ring (14) with teeth (33) having inclined check faces (35, 36) provided on their ends facing the gear shift sleeve, which check faces (35, 36) coact with matching check faces (37, 38) on the ends of the teeth (34) of the gear shift sleeve, it is provided for the purpose of reducing cold scratch that the check faces on the ends of the teeth (34) of the gear shift sleeve are designed asymmetrically in such a manner that the check faces (37) leading in the sense of rotation (28) have a greater axial extension than the check faces (38) trailing in the sense of rotation. This ensures that accelerated synchronization occurs after attainment of synchronous speeds when due to the existence of high braking moments in the transmission, in particular due to the high viscosity of cold transmission oil, the transmission is braked too rapidly in a manner interfering with the synchronization process. A similar effect can be achieved also with the aid of pressure elements which guarantee that the synchronizing ring is rotated radpily into the locked position opposite the sense of rotation. Particularly favorable effects are obtained when the inclined faces described before are employed in combination with such pressure elements.

8 Claims, 3 Drawing Sheets

SYNCHRONIZING MECHANISM FOR CLUTCHES

This is a continuation of application Ser. No. 803,305, filed Dec. 2, 1985, now abandoned.

The present invention relates to a synchronizing mechanism for clutches, in particular for transmissions for motor vehicles, comprising at least one pair of gears having one gear which is arranged coaxially with a gear shift sleeve and which is provided with an externally toothed clutch body and can be cut into or out of the line of force transmission by axial displacement of the internally toothed gear shift sleeve which is fixed to a shaft via a guide sleeve so as to rotate with the shaft, and comprising further a synchronizing ring which in the circumferential direction as in form-locking engagement with the gear shift sleeve and in frictional engagement with the clutch body and which comprises check faces for the gear shift sleeve permitting the internal toothing of the gear shift sleeve to come into engagement with the external toothing of the clutch body only when the two parts rotate at synchronous speeds.

Synchronizing mechanisms of this type, which are based on the the Borg-Warner synchronizing principle, have been known before in many different forms. One special design of such a synchronizing mechanism has been described for instance by German Patent Specification No. 26 59 448. During shifting the gear shift sleeve is displaced axially from a neutral position. It entrains on its way the synchronizing ring and urges it against the countercone of the clutch body. This brings the synchronizing ring and the clutch body into frictional engagement whereby the speeds of the shaft, the gear shift sleeve and the synchronizing ring on the one hand and the clutch body and that gear of the pair of gears which is to be cut in on the other hand are adapted to each other. As long as synchronism in speed is not reached, the synchronizing ring is rotated by the clutch body in the circumferential direction relative to the gear shift sleeve to the extent permitted by the form-locking engagement between the synchronizing ring and the gear shift sleeve. The synchronizing ring is provided with check faces which are thereby moved into a position in which they get into engagement with corresponding check faces provided on the gear shift sleeve to prevent any axial displacement of the gear shift sleeve toward the clutch body. In the known synchronizing mechanisms, these check faces are usually provided on an external toothing of the synchronizing ring which is identical to the external toothing of a clutch body, while the counterfaces are provided at the ends of the teeth forming the internal toothing of the gear shift sleeve. When synchronism in speed has been reached, the gear shift sleeve can move past the check faces of the synchronizing ring to engage the external toothing of the clutch body.

When shifting from a lower to a higher speed (shifting up) the gear which is arranged coaxially with the gear shift sleeve and which is to be cut in when shifting up will initially run faster than the gear shift sleeve so that normally it must be braked down to a synchronous speed by the synchronizing ring. However, when high braking forces act upon the transmission, for example due to the high viscosity of the transmission oil encountered under cold conditions, then a high deceleration will occur as a result of these braking forces after disengagement from the lower gear so that during engagement of the higher gear the speed may drop so considerably that synchronous speeds are obtained between the gear shift sleeve and the clutch body and the gear shift sleeve can move past the check faces of the synchronizing ring without any frictional engagement having been established between the synchronizing ring and the clutch body, or that when the toothing of the gear shift sleeve reaches the check toothing the synchronizing ring is already in its neutral position so that the gear shift sleeve can move freely into engagement with the toothing of the clutch body. Thus, the before-mentioned braking effect may reduce the speed of the gear, which is provided coaxially with the gear shift sleeve, still further so that during further adjustment of the gear of the teeth of the clutch body come to slide past the teeth of the gear shift sleeve. This gives rise to a scraping noise, also known as scratch and, normally is encountered only with cold transmissions where the viscosity of the transmission oil is correspondingly high.

Now, it is the object of the present invention to improve a synchronizing mechanism of the type described above so that this phenomenon, i.e. the so-called "cold scratch" described above, is reduced.

This object is achieved in accordance with the invention by an arrangement of the synchronizing mechanism which is characterized by means for bringing the leading check faces —viewed in the sense of rotation—on the gear shift sleeve and the rear check faces on the synchronizing ring into engagement upon attainment of synchronous speeds when due to high viscosity of the transmission oil the speed of the gear arranged coaxially with the gear shift sleeve drops during shifting up from a speed above the synchronous speed to a speed below the synchronous speed.

Thus, the invention ensures that despite the momentaneous synchronism existing between the gear shift sleeve and the synchronizing ring the gear shift sleeve is not brought into engagement with the toothing of the synchronizing ring rightout; rather the gear shift sleeve comes into engagement with the check faces of the synchronizing ring in such a manner that the clutch is entrained by the synchronizing ring against the braking action of the highly viscous oil and forced to rotate at synchronous speed with the gear shift sleeve. Only when synchronous speeds are attained under these conditions can the gear be engaged in the usual manner. This eliminates one essential source of the phenomenon known as "cold scratch".

One particularly simple measure by which the leading check faces on the gear shift sleeve can be brought into engagement with the rear check faces on the synchronizing ring consists in giving the leading check face—viewed in the direction of rotation—on the gear shift sleeve an axial extension greater than that of the trailing check face.

One ensures in this manner that when the speed drops below the synchronous speed during shifting, the axial contact area of the check faces which engage each other when the gear shift sleeve rotates at a higher speed than the clutch body and, thus, the time for achieving such engagement which is available during the shifting operation are increased so as the locking function of the synchronizing ring is effective when the difference in the speeds of the gear shift sleeve and the clutch body reaches the point where scratching would otherwise occur. The same effect is achieved also when the trailing check face—viewed in the direction of rotation—on the toothing of the synchronizing ring has a greater axial extension than the leading check face—viewed in the direction of rotation. The only thing that matters is that the axial contact area must be increased which can be achieved also by giving the said check faces on both, the gear shift sleeve and the synchronizing ring, greater extensions in the axial direction.

Due to the asymmetrical arrangement of the check faces on the teeth of the gear shift sleeve, their crest is shifted in one direction relative to the gap between the teeth of the clutch body, and consequently different paths of rotation are obtained for the clutch body during engagement of the gear, depending on the side on which the check faces of the teeth of the gear shift sleeve get into contact with the check faces on the roof faces of the teeth of the clutch body. These differences make themselves felt for the operator. In order to remove this effect, too, one preferred embodiment of the invention provides that the roof faces of the external toothing of the clutch body are designed asymmetrically in the same manner as the check faces of the gear shift sleeve so that in the engaged position the position of the crest formed between the check faces of the gear shift sleeve is at least approximately symmetrical relative to the crests formed between the roof faces of two neighbouring teeth of the external toothing of the clutch body.

Due to this measure, the sliding paths are substantially equal in both directions. Another advantage of this embodiment is to be seen in the fact that during shifting the same surface loading is encountered between the teeth of the gear shift sleeve and the clutch body on the pulling and the pushed flanks, respectively.

As mentioned before, the described extension of the leading check faces on the gear shift sleeve serves the purpose to extend the period of time during which the synchronizing ring which lags behind the gear shift sleeve can move into engagement with the leading check faces of the gear shift sleeve. A similar effect can be achieved also by reducing the period of time which is required by the synchronizing ring, once the synchronous speed has been reached, for getting into engagement with the leading check faces of the synchronizing ring by a further speed reduction. Accordingly, in another embodiment of the invention, a pressure element is provided between the guide sleeve and the synchronizing ring, which pressure element tends to retain the synchronizing ring in its rearward position, relative to the guide sleeve, viewed in the direction of rotation. Once synchronous speeds have been reached, the pressure element thus acts to reduce the speed of the synchronizing ring so that its trailing check faces come to bear against the leading check faces of the gear shift sleeve before the gear shift sleeve has left the area of the check faces at normal shifting speed. Thereafter, the check faces remain active until synchronous speeds are again obtained by acceleration of the clutch body and the gear arranged coaxially with the gear shift sleeve.

The pressure element may be implemented in different manners. In a preferred embodiment of the invention, the pressure element is formed by a bolt which extends in the circumferential direction of the synchronizing ring, which is loaded by a spring and which can be displaced in the longitudinal direction. Such a bolt may be seated in a stop nose of the synchronizing ring engaging a recess in the guide sleeve and may have its free end in contact with the leading flank of the recess, viewed in the direction of rotation. However, it is also possible to have the bolt seated in an axial projection of the synchronizing ring and provided on its free end with an inclined face which is in contact with a matching inclined face on the gear shift sleeve pointing rearwardly in the direction of rotation. This inclined face may advantageously be arranged at the end of a shorter tooth of the interior toothing of the gear shift sleeve.

It goes without saying that a synchronizing mechanism according to the invention may be provided also with both, asymmetrical check faces on the gear shift sleeve and pressure elements between the guide sleeve and the synchronizing ring, because the functions of these two means supplement each other so that the combination of the two arrangements provides particularly effective means for preventing cold scratching. Further, the measures according to the invention may be combined also with those provided by Patent (Application) No. P 34 11 351.7 which are aimed at preventing the synchronization from getting lost in the period of time between the moment when synchronism in speed has been reached, with the resulting loss of the axial force, and the movement when the internal toothing of the gear shift sleeve engages the outer toothing of the clutch body.

The invention will be described hereafter in closer detail with reference to the embodiments shown in the drawing, it being understood that the features described in the specification and shown in the drawing may be employed in other embodiments of the invention individually or in any desired combination. In the drawing.

Figure 1:
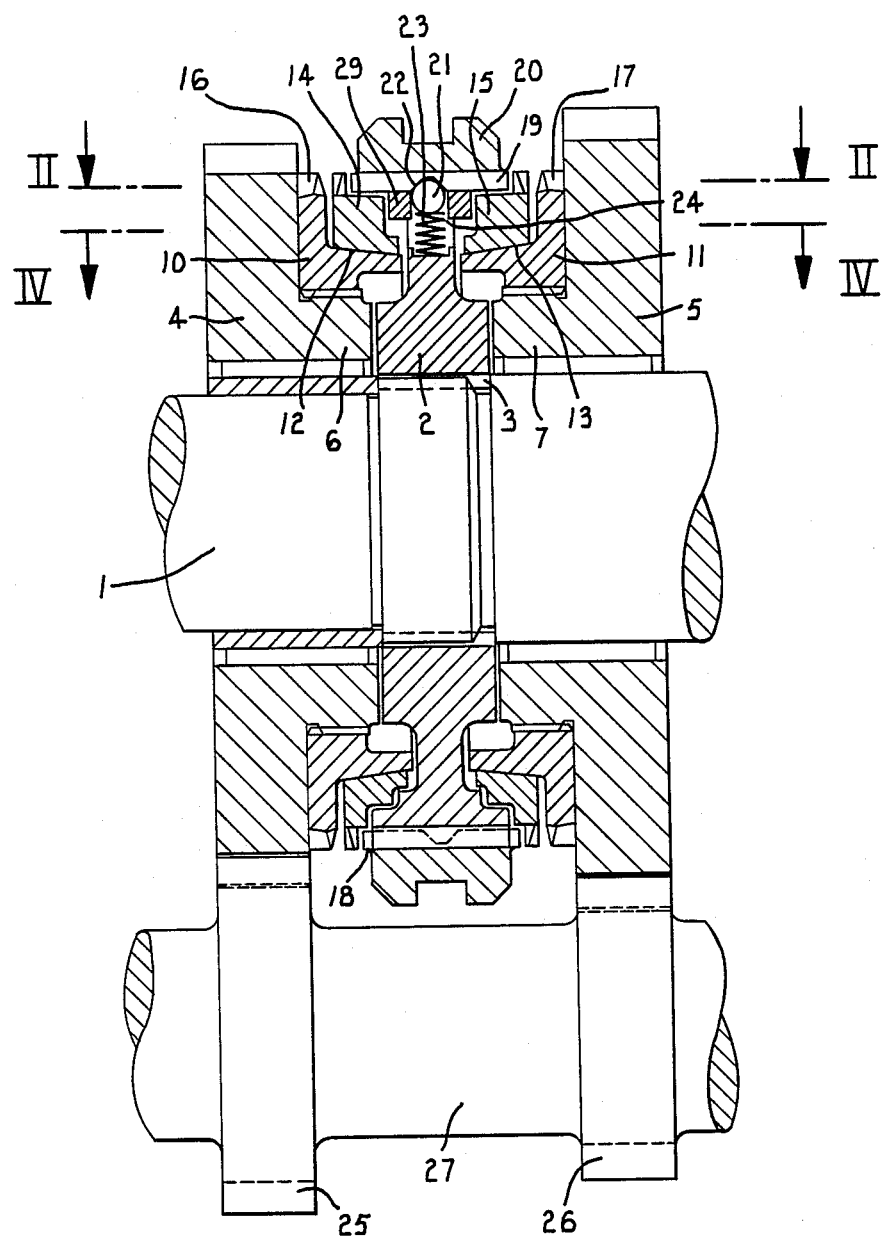
FIG. 1 shows a longitudinal cross-section through a portion of a transmission comprising a synchronizing mechanism according to the invention.

The portion of a transmission shown in FIGS. 1 to 5 comprises a shaft 1 carrying a guide sleeve 2 fixed thereon, by means of a toothing 3, against relative rotation and against axial displacement. Gears 4, 5 are seated rotatably on the shaft 1 on both sides of the guide sleeve 2. The gears 4, 5 are provided on their sides facing the guide sleeve 2 with an axial extension 6, 7 each with clutch bodies 10, 11 fitted thereon. The clutch bodies 10, 11 are provided with an internal toothing engaging an external toothing on the extensions 6, 7 so that they are connected with the coacting gears 4, 5 to rotate with the latter. Each of the clutch bodies is provided with a conical face 12, 13 forming a countercone for a synchronizing ring 14, 15. In addition, the clutch bodies 10, 11 are provided each with an external toothing 16, 17 over a portion of their periphery adjoining the countercone 12, 13. The external toothing 16, 17 is identical in diameter and pitch to an external toothing 18 provided on the periphery of the guide sleeve 2 and engaged by the internal toothing 19 of a gear shift sleeve 20 which in its inoperative position is arranged centrally to the center plane of the guide sleeve 2 and provided with a central annular groove 22 which is engaged by stop balls 21. The stop balls 21 are arranged in radial bores 24 of the guide sleeve 2, together with helical pressure springs 23 loading them.

The gears 4,5 are in engagement with the gears 25, 26 seated in fixed relationship on an auxiliary shaft 27 arranged in parallel to the shaft 1. In the operative condition of the transmission, the gears 4, 5 which are seated to rotate freely on the shaft 1 are, therefore, always entrained by the gears 25, 26 seated on the auxiliary shaft 27. Shifting to a particular speed is effected in the known manner by displacing the gear shift sleeve 20 in the axial direction until it comes into engagement with the outer toothing 16, 17 of the clutch body of a neighbouring gear 4, 5 whereby a rigid connection is established between the drive shaft 1 and the gear which is in engagement with the gear shift sleeve.

It will be assumed for the purposes of the further description that the portion of the transmission shown in FIG. 1 comprises the first and the second speed of a vehicle gearbox. When the gear shift sleeve 20 is coupled with the gear 5, i.e. the right-hand gear in FIG. 1, which is assigned to the first speed, then the gear 4 which is assigned to the second speed rotates at a higher speed than the gear 5. If it is further assumed that the arrow shown in FIGS. 2 to 4 indicates the sense of rotation 28 of the shaft 1 with the gear shift sleeve 20, then the gear 4 with the associated clutch body 10 and its toothing 16 rotate at a higher speed than the gear shift sleeve 20, in the direction of rotation 28.

Now, to shift from the first to the second gear, i.e. to shift up, the gear shift sleeve is disengaged from the external toothing 17 of the clutch body 11 and brought into the neutral position shown in FIG. 1. When the gear shift sleeve is moved further to the left—in FIGS. 1 to 3—towards the gear 4, it entrains the neighbouring synchronizing ring 14 through a dog 29, thereby bringing the synchronizing ring into engagement with the conical face 12 of the clutch body 10. Due to the frictional contact, the synchronizing ring 14 is entrained in the direction of rotation 28 by the faster gear 4 with the clutch body 10 until an axial stop nose provided thereon comes to bear against a flank 31 of a recess 32 in the guide sleeve 2 pointing into a direction opposite to the direction of rotation 28. The synchronizing rings are provided with an external toothing corresponding to the external toothing of the clutch body and the internal toothing of the gear shift sleeve. The ends of the teeth 33 facing the teeth 34 of the gear shift sleeve are provided with inclined check faces 35, 36 coacting with matching inclined check faces 37, 38 provided on the teeth of the gear shift sleeve 20. In the described position of the synchronizing ring 14, the trailing check faces 38—viewed in the direction of rotation 28—of the gear shift sleeve come to bear against the leading check faces 35—viewed in the direction of rotation 28—of the teeth 33 of the synchronizing ring. The axial force exerted via the check faces upon the synchronizing ring 14 urges the synchronizing ring upon the conical face 12 of the neighbouring clutch body so that the clutch body with the gear 4 are braked until synchronism is obtained between the gear shift sleeve, the synchronizing ring and the clutch body with the gear. Then the toothing 19 of the gear shift sleeve can be brought into engagement with the external toothing 16 of the clutch body slightly. In order to facilitate this engaging operation, the teeth arranged on the circumference of the clutch body are provided with inclined roof faces 39, 40 at their ends facing the gear shift sleeve.

The natural frictional forces in the transmission, i.e. the bearing friction and the braking effect of the transmission oil, also help achieve the necessary reduction of the speed of the gear assigned to the higher speed. In cold transmissions, in particular, the high viscosity of the transmission oil may result in a braking effect so important that the speed of the gear with the clutch body to be coupled drops so rapidly that the clutch body and the gear shift sleeve rotate in synchronism so that the synchronizing ring has no defined position and the teeth 34 of the gear shift sleeve can enter between the teeth 33 of the synchronizing ring without encountering any resistance. In this case, there are no axial forces exerted upon the synchronizing ring that would synchronize the neighbouring gear with the clutch body 10. Consequently, the gear 4 to be coupled, with the clutch body 10, may already rotate at a speed lower than the gear shift sleeve when the toothing of the gear shift sleeve reaches the toothing of the clutch body so that a relative movement between these two toothings 10 will be encountered. The sliding movement between the inclined roof faces provided at the ends of the matching teeth makes itself felt during shifting and produces a scraping noise, also known as "scratch", in particular "cold scratch", because it is encountered predominantly with cold transmissions.

In the transmission according to the invention this effect is largely reduced by an asymmetrical design of the check faces 37, 38 at the teeth 34 of the gear shift sleeve. While the two check faces have the same inclination relative to the axial direction, they are set off relative to the longitudinal center of the tooth 34 so that the check face 37 leading in the sense of rotation 28 exhibits a greater axial extension than the check face 38 trailing in the sense of rotation. In the case of the symmetrical design of the teeth 34 of the gear shift sleeve 20 indicated by the broken lines, no synchronizing work can be performed when the gear shift sleeve 20 enters between the teeth 33 of the synchronizing ring 14 because there are no faces that could come to act against each other in order to transmit the axial force necessary for achieving the desired synchronization. In the case of the transmission of the invention, however, when the synchronizing ring is braked together with the clutch body of the gear so that it rotates more slowly than the gear shift sleeve which means that its movement relative to the gear shift sleeve is directed opposite to the sense of rotation 28, the leading check face 37 may come into engagement with the trailing check face 36 of the neighbouring tooth 33 of the synchronizing ring over the length D by which the leading check face 37 is longer in the axial direction than the trailing check face 38.

Now, when the transmission is braked so heavily that the so-called cold scratch occurs, the trailing check face 36 of the synchronizing ring will come into engagement with the leading check face 37 of the gear shift sleeve, which is extended in the axial direction, thus preventing the gear shift sleeve from being further engaged. Consequently, these check faces now exert upon the synchronizing ring an axial force which forces the clutch body with the gear in the conventional manner into synchronism, and when the latter has been reached, the gear shift sleeve can be moved into the coupling position without giving rise to any noise.

When the internal toothing of the gear shift sleeve 20 with the check faces 37, 38 at the ends of its teeth 34 encounters the inclined roof faces 39, 40 at the ends of the external toothing 16 of the clutch body, the said faces will slide on each other while rotating the clutch body relative to the gear shift sleeve until the teeth 34 of the gear shift sleeve are positioned opposite the gaps between the teeth 16 of the clutch body. It will be readily seen that in the case of the conventional symmetrical design of the teeth 16, as represented by dash-dotted lines in FIGS. 2 and 3, the sliding paths differ in length depending on whether the teeth 34 of the gear shift sleeve come to act on the counterface by their short check face 38 or their long check face 37. The different lengths of the sliding path resulting therefrom are noticeable during shifting and are felt to be troublesome. In order to avoid these different sliding paths, the inclined roof faces 39, 40 of the teeth 16 of the clutch body have been given a likewise asymmetrical design in the illustrated embodiment of the invention so that the leading inclined roof faces 39 exhibit a greater axial length than the trailing roof faces 40 and that, consequently, the crest 41 formed between the check faces 37, 38 of the teeth 34 of the gear shift sleeve is positioned approximately midway between the crests 42 of the toothing 16 of the clutch body 10 when the teeth 34 of the gear shift sleeve are positioned opposite the gaps of the toothing 16 of the clutch body, as shown in FIG. 3

In the embodiment shown in FIGS. 1 to 5, a bolt 44 loaded by a spring 43 is further seated in sliding relationship in the stop nose 30 of the synchronizing ring 14. The said bolt bears against the flank 31 of the recess 32 in the guide sleeve 2 pointing into a direction opposite the direction of rotation 28. The bolt which extends in the circumferential direction tends to rotate the synchronizing ring relative to the guide sleeve 2 in a direction opposite to the sense of rotation 28.

Figure 2:
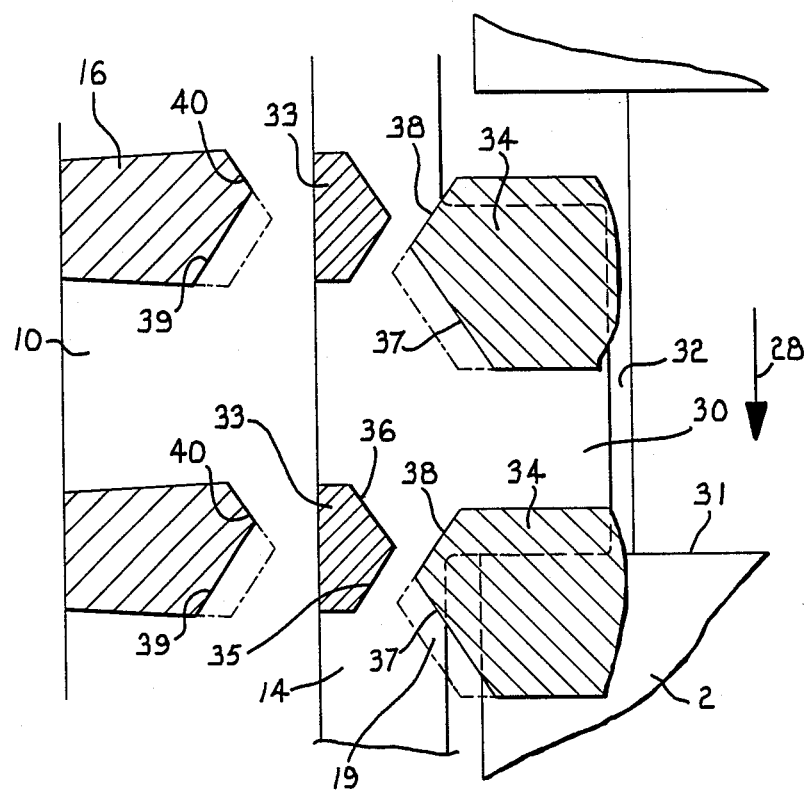
FIG. 2 shows, in enlarged scale, part of a developed projection of the cylindrical surface defined by line II—II, of the portion of the transmission shown in FIG. 1.
Figure 3:
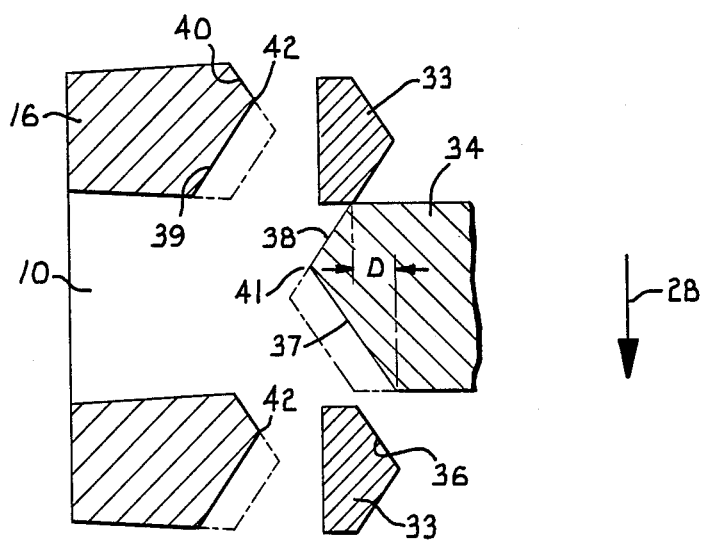
FIG. 3 shows the arrangement of FIG. 2 at the moment when the gear shift sleeve and the synchronizing ring rotate in synchronism.

When during shifting to a higher speed, the tooth 4 with the clutch body 10 rotates faster than the guide sleeve with the synchronizing ring 14, as described before, the synchronizing ring will be entrained, due to the frictional engagement between the synchronizing ring and the clutch body produced during coupling, into the position shown in FIG. 2 in which the spring 43 loading the bolt 44 is in the tensioned condition.

As soon as synchronism has been reached, the torque exerted by the conical face of the clutch body 10 of the synchronizing ring ceases to be effective so that the spring 43 is relieved. This causes the synchronizing ring to be rotated relative to the guide sleeve 2, in a direction opposite to the sense of rotation, until the stop nose 30 comes to rest against the opposite flank 45 of the recess 32 pointing into the direction of rotation 28. This accelerates the engagement between the trailing check face 36 of the teeth 33 of the synchronizing ring 14 and the leading check faces 37 of the teeth 34 so that the synchronizing operation described before can take place, thus preventing the so-called "cold scratch". The change in position of the synchronizing ring effected by the spring-loaded bolts 44 when synchronism is achieved makes it possible also to do without asymmetrical check faces at the teeth 34 of the gear shift sleeve, although the combination of the two described measures is particularly effective.

Figure 4:
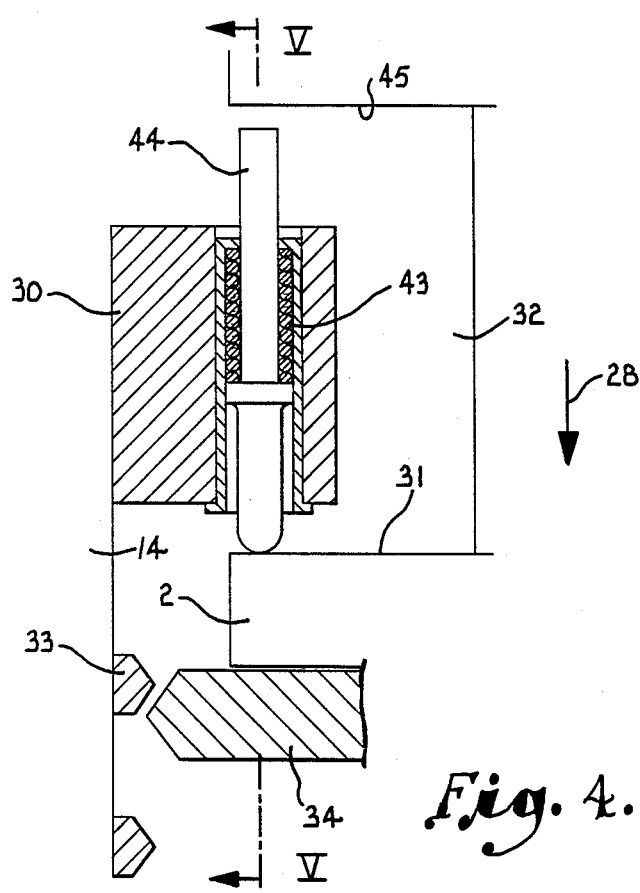
FIG. 4 shows a partial cross-section along line IV—IV through the transmission shown in FIG. 1, again in enlarged scale.
Figure 5:
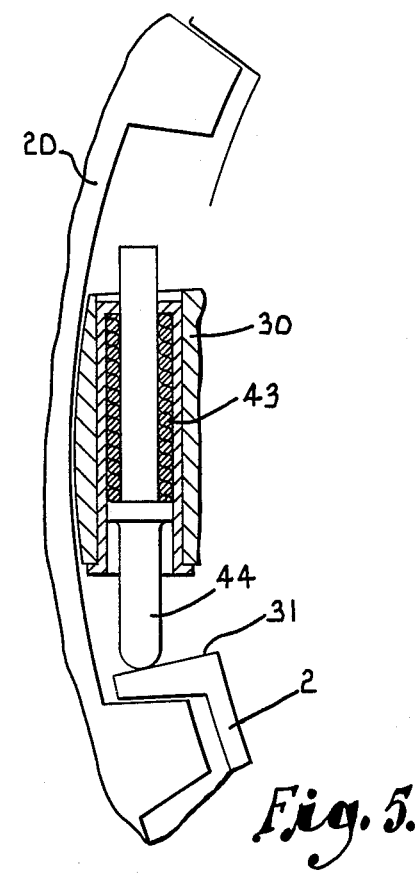
FIG. 5 shows a section along line V—V through the arrangement shown in FIG. 4.
Figure 6:
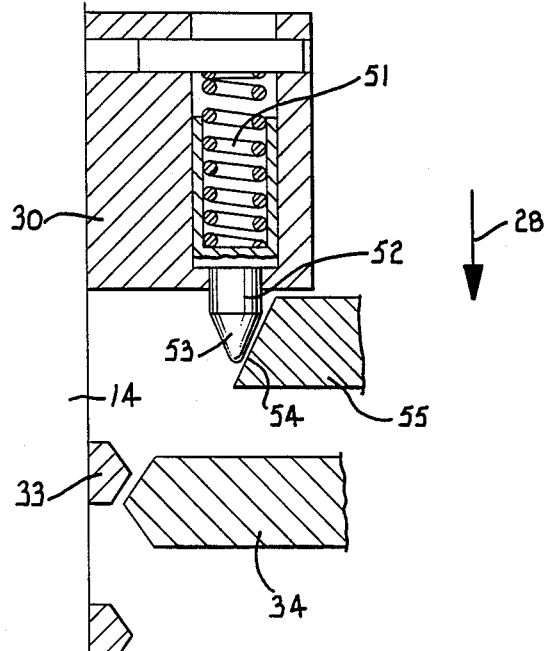
FIG. 6 shows a further embodiment of a synchronizing mechanism according to the invention, similar to the representation shown in FIG. 4.
Figure 7:
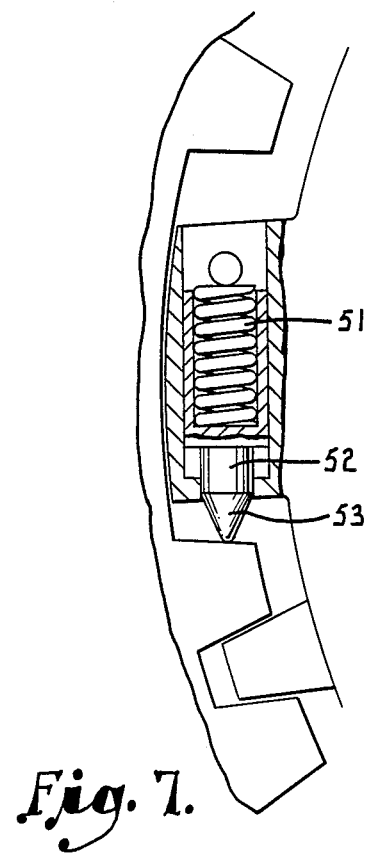
FIG. 7 shows the arrangement of FIG. 6 in a representation similar to FIG. 5.

FIGS. 6 and 7 illustrate a different embodiment of a bolt arrangement shown in FIGS. 4 and 5. In this case, the bolt 52, which is again seated in the stop nose 30 of the synchronizing ring 14 and loaded by a spring 51, does not coact with the flank 31 of the recess 32, but rather with the tapered end of a shorter tooth 55 of the gear shift sleeve.

When the gear shift sleeve, starting out from the position of the synchronizing ring 14 shown in FIG. 2, is displaced axially towards the synchronizing ring, the inclined face 54 of the shorter tooth 55 of the gear shift sleeve comes to bear against the tapered face 53 of the bolt 52 and pushes the bolt back against the action of the spring 51. Then, when synchronism in speed has been reached as described above as a result of the interaction between the check faces on the gear shift sleeve and the synchronizing ring and the tapering faces on the synchronizing ring and the clutch body, so that the gear shift sleeve is permitted to continue its axial movement, the interaction between the inclined face 54 at the end of the shorter tooth 55 of the gear shift sleeve and the tapered face 53 at the end of the bolt 52 ensures that the synchronizing ring is rotated into the other locked position rapidly, due to the relief of the spring 51, and independently of the axial movement of the gear shift sleeve 22, which position permits again the set of gears to be accelerated to synchronous speed, against the braking forces occurring in the transmission and, thus, the coupling operation to be performed without any noise.

It goes without saying that the invention is not limited to the embodiments shown. In particular, it is possible to use either the inclined faces or the pressure bolt arrangements alone, although the combination of the two arrangements gives particularly favourable results. Further, the trailing check faces of the teeth provided on the synchronizing ring may also be extended in the axial direction instead of, or in addition to, providing the check faces on the teeth of the gear shift sleeve. In addition, it is also possible to combine the arrangements according to the invention with the measures described by the documents of German Patent Application No. P 34 11 351.7.

We claim:

1. A synchronizing mechanism for clutches, comprising:
   a rotatable shaft;
   at least one pair of meshing gears having one gear mounted on the shaft for relative rotation;
   a clutch body on said one gear presenting external teeth;
   a guide sleeve mounted on the shaft for rotation therewith;
   a gear shift sleeve mounted on said guide sleeve for rotation therewith, said gear shift sleeve having internal teeth and said gear shift sleeve being displaceable axially on said guide sleeve to bring said internal teeth into force transmitting engagement with said external teeth of the clutch body;
   a toothed synchronizing ring in form-locking engagement with the guide sleeve and in frictional engagement with the clutch body circumferentially, said synchronizing ring having limiting positions relative to the guide sleeve defined as forward and rearward positions when the synchronizing ring is rotating in a predetermined direction;
   a pair of check faces on each tooth of said gear shift sleeve, said check faces in each pair comprising a leading check face and a trailing check face when the gear shift sleeve is rotating in said predetermined direction;

a pair of check faces on each tooth of said synchronizing ring comprising a leading check face and a trailing check face when the synchronizing ring is rotating in said predetermined direction, said pairs of check faces on the teeth of the gear shift sleeve and of said synchronizing ring cooperating to permit the teeth of the gear shift sleeve to come into engagement with the external teeth of the clutch body when the gear shift sleeve and the clutch body rotate at a synchronous speed; and said leading check faces on the teeth of the gear shift sleeve each having an axial extension greater than that of the trailing check face on the same tooth.

2. The mechanism of claim 1, including a pair of roof faces on each tooth of said clutch body, said roof faces in each pair comprising a leading roof face and a trailing roof face when the clutch body is rotating in said predetermined direction, said leading roof face on each tooth of the clutch body having an axial extension greater then that of the trailing roof face on the same tooth.

3. The mechanism of claim 1 or 2, including:
a pressure element yieldably urging said synchronizing ring toward said rearward position.

4. The mechanism of claim 3, wherein said pressure element comprises:

a bolt carried on said synchronizing ring and having a longitudinal axis oriented substantially circumferentially of the synchronizing ring; and a spring urging said bolt against the guide sleeve in a direction longitudinally of the bolt to urge the synchronizing ring toward the rearward position.

5. The mechanism of claim 4 wherein:

said guide sleeve presents a recess therein having a leading flank and a trailing flank when the guide sleeve is rotating in said predetermined direction;

said synchronizing ring includes a stop nose fitting in said recess; and said bolt includes an end urged by said spring against said leading flank of the recess.

6. The mechanism of claim 4, including:

an axial projection on the synchronizing ring in which said bolt is seated;

an inclined face on the gear shift sleeve facing generally rearwardly when the shift sleeve is rotating in said predetermined direction; and an end of said bolt presenting an inclined face in contact with said inclined face on the gear shift sleeve.

7. The mechanism of claim 6, wherein one of the internal teeth on said gear shift sleeve projects axially therefrom a lesser distance than the remainder of said internal teeth of the gear shift sleeve, said inclined face on the gear shift sleeve being located on said one tooth.

8. The mechanism of claim 1, wherein the leading and trailing check faces on the teeth of the gear shift sleeve each have the same angle of inclination with respect to the axis of rotation of the synchronizing mechanism.

* * * * *